(12) United States Patent
Schenk

(10) Patent No.: US 7,813,450 B2
(45) Date of Patent: Oct. 12, 2010

(54) METHOD AND CIRCUIT ARRANGEMENT FOR REDUCING RFI INTERFACE

(75) Inventor: Heinrich Schenk, München (DE)

(73) Assignee: Infineon Technologies AG, Munich (DE)

( * ) Notice: Subject to any disclaimer, the term of this patent is extended or adjusted under 35 U.S.C. 154(b) by 1367 days.

(21) Appl. No.: 11/241,856

(22) Filed: Sep. 30, 2005

(65) Prior Publication Data

US 2006/0088113 A1    Apr. 27, 2006

(30) Foreign Application Priority Data

Sep. 30, 2004 (DE) .................. 10 2004 047 717

(51) Int. Cl.
*H04B 7/19* (2006.01)
*H04B 7/15* (2006.01)
*H04B 7/185* (2006.01)
*H04L 27/28* (2006.01)

(52) U.S. Cl. .............. 375/316; 375/295; 455/12.1; 455/11.1; 455/3.02

(58) Field of Classification Search .......... 455/12.1, 455/13.2, 23, 17, 39, 42, 91, 102, 3.02, 427, 455/11.1; 375/260, 295, 316, 300, 302, 309, 375/320, 322, 329, 334

See application file for complete search history.

(56) References Cited

U.S. PATENT DOCUMENTS

| | | | |
|---|---|---|---|
| 5,995,567 A | 11/1999 | Cioffi et al. | |
| 6,014,412 A | 1/2000 | Wiese et al. | |
| 6,035,000 A | 3/2000 | Bingham | |

(Continued)

FOREIGN PATENT DOCUMENTS

| | | |
|---|---|---|
| DE | 697 14 241 T2 | 2/2003 |
| DE | 698 11 716 T2 | 12/2003 |
| WO | WO 03/039088 A1 | 5/2003 |

OTHER PUBLICATIONS

Nilsson, Rickard, et al. "A Narrow-band Interference Canceller for OFDM-based Systems." *Proceedings of 4th European Personal Mobile Communications Conference.* Vienna: Feb. 17-22, 2001.

(Continued)

*Primary Examiner*—David C Payne
*Assistant Examiner*—Linda Wong
(74) *Attorney, Agent, or Firm*—Maginot Moore & Beck

(57) ABSTRACT

In a method for reducing RFI interference in a DMT data transmission a compensation signal for the purpose of reducing an RFI interference signal superposed on a transmitted DMT reception signal is generated. Only carrier frequencies of the DMT reception signal in the vicinity of the interference frequency of the interference signal which are not utilized for the data transmission are used, at least one normalized complex spectral function for all the carriers of said interference signal is provided, an FFT for the purpose of obtaining spectral values of said DMT reception signal is carried out, and an observation window to a current DMT frame of the DMT reception signal is assigned. A complex evaluating coefficient for the current DMT frame is calculated and the complex evaluating coefficient resulting from the spectral values of said DMT reception signal within the observation window and the complex evaluating coefficient are identical for all frequencies within the current DMT frame. The compensation signal is calculated by multiplying the normalized complex spectral function with the complex evaluating coefficient.

21 Claims, 13 Drawing Sheets

U.S. PATENT DOCUMENTS

| | | |
|---|---|---|
| 6,400,781 B1 * | 6/2002 | Vandendorpe et al. ...... 375/350 |
| 6,404,830 B2 | 6/2002 | Wiese et al. |
| 6,449,324 B2 | 9/2002 | Wiese et al. |
| 6,456,673 B1 | 9/2002 | Wiese et al. |
| 6,535,552 B1 * | 3/2003 | Pessoa ...................... 375/231 |
| 6,563,841 B1 * | 5/2003 | Nedic et al. ................ 370/480 |
| 6,738,440 B1 | 5/2004 | Isaksson et al. |
| 6,931,292 B1 * | 8/2005 | Brumitt et al. .............. 700/94 |
| 2001/0026602 A1 | 10/2001 | Wiese et al. |
| 2001/0028692 A1 | 10/2001 | Wiese et al. |
| 2002/0123321 A1 * | 9/2002 | Antoine et al. ............. 455/296 |
| 2002/0186799 A1 * | 12/2002 | Sayeed ...................... 375/345 |
| 2005/0008085 A1 * | 1/2005 | Lee et al. ................... 375/260 |
| 2005/0063487 A1 * | 3/2005 | Sayegh ...................... 375/316 |
| 2009/0296800 A1 * | 12/2009 | Tseng et al. ................ 375/232 |

OTHER PUBLICATIONS

Fanucci, L., "VLSI Design of a Digital RFI Cancellation Scheme for VDSL Transceivers", Euromicro Symposium on Digital System Design 2004, pp. 182-189, (8 pages).

Schwarz et al., "Detection and Compensation of Narrowband Interference for Wireline Multi-Carrier Modulator Systems", First International Symposium on Control, Communications and Signal Processing 2004, pp. 377-390, (4 pages).

* cited by examiner

METHOD AND CIRCUIT ARRANGEMENT FOR REDUCING RFI INTERFACE

FIELD OF THE INVENTION

The invention relates to a method and a circuit arrangement for reducing RFI interference in a DMT data transmission.

DESCRIPTION OF THE RELATED ART

High-bit-rate data transmission on a subscriber line is increasingly becoming more important in modern telecommunications, particularly because it is anticipated to yield a larger useable bandwidth of the data to be transmitted combined with bidirectional data communication.

One technique which has recently been gaining more and more in importance is so-called multicarrier data transmission, also known as "Multicarrier" transmission, as "Discrete Multi-tone" transmission (DMT) or as "Orthogonal Frequency Division Multiplexing" transmission (OFDM). DMT transmission is suitable particularly for data transmission via linearly distorted channels. Compared with single-carrier data transmission, advantages are also afforded with regard to flexibility in adapting the data rate or the transmission spectrum to the transmission channel or to the interference environment. DMT transmission is used for example in conductor-based systems, but also in the field of radio, for broadcast systems and for access to data networks. Examples of applications of DMT transmission are digital radio broadcasting (DAB=Digital Audio Broadcast) and digital television (DVB=Digital Video Broadcast).

One representative of DMT transmission is the ADSL technique, for example, where ADSL stands for "Asymmetric Digital Subscriber Line", that is to say asymmetric digital subscriber access connection via a normal telephone line. ADSL denotes a technique that permits the transmission of a high-bit-rate bit stream from a central station to a subscriber and of a low-bit-rate bit stream passing from the subscriber to a central station. This technique involves subdividing the telecommunication line into at least one channel for conventional telephone services (that is to say voice transmission) and at least one further channel for data transmission. In addition to the ADSL technique there are also further representatives of the so-called xDSL technique, thus for example broadband subscriber access connection (VDSL=Very High Speed Digital Subscriber Line).

DMT transmission systems use a multiplicity of carrier frequencies, the data stream to be transmitted being decomposed into many parallel partial streams that are transmitted by frequency division multiplexing. These partial streams are also referred to as individual carriers. For the modulation, the transmission signal is composed of many sinusoidal signals, each individual sinusoidal signal being modulated both in terms of amplitude and in terms of phase. A multiplicity of quadrature-amplitude-modulated signals are thus obtained. For DMT transmission, an IFFT transformation is used in the transmitter and an FFT transformation is used in the receiver. Efficient and fast signal processing algorithms exist both for the IFFT and for the FFT.

Even though very many problems have already been solved in the case of DMT transmission systems such as aDSL and VDSL, some problems still remain unsolved.

One problem that is primarily associated with very broadband DMT transmission results from the fact that the useable frequency range extends to above 12 MHz or more. However, this wide frequency range also contains frequency bands for other services such as, for example, the frequency bands for medium-wave and short-wave radio broadcasting or the frequency ranges for amateur radio. Depending on the spatial position, the subscriber terminals of DMT transmission may be disturbed by these services that use the same frequency range of DMT transmission. The term employed here is so-called RFI interference, where RFI stands for "Radio Frequency Interference". This RFI interference represents narrowband interferences relative to the very broadband frequency range utilized for DMT transmission, since these interfering RFI frequency ranges typically have a width of just a few kilohertz.

If such a narrowband interference signal is superposed on the DMT reception signal, the demodulated DMT reception signal is then adversely affected thereby. Not only the values (carrier frequencies) in the immediate vicinity of the centroid frequency of this interference are disturbed in this case. Carrier frequencies (or useful channels) of the DMT reception signal that are much further away from this interference frequency are also disturbed.

This shall be explained on the basis of an example in the case of a VDSL data transmission and an assumed purely sinusoidal interference having the frequency $f_0=1211.1$ kHz. The DMT receiver demodulates the received DMT reception signal with the aid of an FFT transformation. In accordance with the VDSL standard, the frequency spacing of the individual synchronous carrier frequencies is precisely $\Delta f=4.3125$ kHz. The interference frequency $f_0$ thus corresponds to none of the carrier frequencies used in the DMT transmission, that is to say that the interference frequency is asynchronous with respect to the carrier frequencies of the DMT transmission.

FIG. 1 shows the normalized power density Pst of an interference signal having the frequency $f_0=1211.1$ kHz after the FFT demodulation in the vicinity of the normalized interference frequency $f_0/\Delta f \approx 281$ as a function of the carrier frequency f. The carrier frequency f is normalized here to the frequency spacing $\Delta f$. FIG. 1 illustrates the resulting interference spectrum—normalized to the maximum value of the interference frequency $f_0/\Delta f$—in dB. It is evident that, without further measures, the interference spectrum has decayed by approximately 50 dB below and above the interference frequency $f_0/\Delta f$ only after approximately 50 carrier frequencies (f/$\Delta f$). This means that useful channels of the DMT reception signal which are relatively far away from the centroid frequency $f_0/\Delta f$ of the interference signal relative to the bandwidth of the interference signal are still disturbed by precisely this interference. This is due to the fact that the narrowband interference signal is typically not present orthogonally or synchronously with respect to the carrier frequencies utilized for the transmission and is thus not completely eliminated either.

The RFI interference, as already mentioned above, comprises relatively narrowband interferences attributable for example to radio broadcasting waves or to amateur radio waves. In medium-wave or short-wave radio broadcasting, the transmitted signals are modulated with the aid of double-sideband amplitude modulation with carriers and emitted. Consequently, a permanent interference having a constant centre frequency is to be reckoned with here (interference of a first type). By contrast, amateur radio involves the use of single-sideband amplitude modulation with a suppressed carrier. Therefore, no permanent interference occurs here (interference of a second type). Rather, the interference here is dependent on the amateur radio transmitter, that is to say the speaker.

The article "A Narrow-Band Interference Canceller for OFDM-based Systems" from Rickard Nilsson, Frank Sjöberg and James P. Leblanc in Proceedings of 4th European Personal Mobile Communications Conference (EPMCC 2001), Vienna, 17-22 Feb. 2001, describes a method for solving this problem. This method deals with the occurrence both of interference of the first type and of interference of the second type. In the method described therein, it is assumed that the carrier frequencies in the immediate vicinity of the interference frequency, in the so-called observation interval, are not utilized for the data transmission. For this purpose, after the FFT demodulation in the receiver, firstly the precise spectral position of the interference signal is determined. By means of suitable processing of the complex frequency values in the observation interval in which the interference frequency is also situated and which contains no portions of the useful signal, it is possible to generate a compensation signal in the form of a complex signal vector. This complex signal vector is subsequently subtracted from the demodulated signal vector of the data transmission.

In the case of this method, however, generating the compensation signal presupposes exact a priori information about the received interference signal, for example in the form of a spectral power density of the interference signal that is as exact as possible and is determined or known at the outset. Furthermore, knowledge that is as accurate as possible about the type and the profile, that is to say the form, of the interference signal is required, that is to say whether the interference is sinusoidal, for example. This method then attempts to simulate the profile of the interference outside the observation interval as accurately as possible, which is very complicated if only for this reason. This means, however, that the applicability, the performance and thus the usefulness of this known method are significantly restricted. Moreover, the realization and implementation of this method requires an exorbitantly high outlay on hardware and software for determining the a priori information and also for calculating the corresponding compensation signals.

SUMMARY OF THE INVENTION

Against this background, therefore, the present invention is based on the object of making it possible, primarily in the case of broadband DMT transmission systems, to reduce RFI interference relative effectively, rapidly and in a reletive simple manner.

The object is achieved in accordance with the invention by means of a method for reducing RFI interference in a DMT data transmission, in which a compensation signal is generated for the purpose of reducing an RFI interference signal superposed on a transmitted DMT reception signal, in which only carrier frequencies of the DMT reception signal in the vicinity of the interference frequency of the interference signal which are not utilized for the data transmission are used for generating the compensation signal, and in which the following method steps are furthermore performed:

(a) provision of at least one normalized complex spectral function for all the carriers of the interference signal;

(b) carrying out an FFT for the purpose of obtaining spectral values of a received DMT data signal;

(c) a current DMT frame of the DMT reception signal is assigned an observation window within which at least one interference frequency is present;

(d) calculation of a complex weighting coefficient for a current DMT frame, which results for this DMT frame from the spectral values of the DMT reception signal in the observation interval and which is identical for all frequencies within the current DMT frame;

(e) calculation of the compensation signal from the product of the complex normalized spectral function with the complex weighting coefficient. (Patent Claim 1).

The object is also achieved in accordance with the invention by means of a DMT receiver circuit for a DMT data transmission system, having a FFT device, which subjects the received data signal to a FFT for the purpose of obtaining spectral values of the DMT data signal, and having a RFI compensator, which is connected downstream of the FFT device and carries out a compensation of an interference signal superposed on the received data signal. The RFI compensator is configured to carry out the above-mentioned inventive method within a current DMT data frame.

With the inventive method and the inventive circuit, respectively, it is possible to reduce both types of RFI interference, that is to say interference of the above-mentioned first type and second type, significantly. Overall, it is thereby possible to utilize a substantially greater part of the available frequency range and thus to considerably increase the data rate for the data transmission.

In a manner similar to that in the case of the known method described above, the carrier frequencies in an observation interval in the immediate vicinity of the narrowband interference frequency are not used for the data transmission in the case of the method according to the invention. Rather, these unused carrier frequencies are used for the generation of a compensation signal. In contrast to the known method, however, the method according to the invention makes no a priori assumptions, information or statements about the spectral distribution of the interference of the narrowband interference source. Merely a rough knowledge of the spectral bandwidth of the interference signal is presupposed, since the length of the observation interval depends on this. This can be realized in a very simple manner without major measures, however, since the type of interference (i.e. RFI interference) is known and it is thus known that the interference is a narrowband interference. The particular advantage of the present invention consists, however, in the fact that the type, the form and the profile of an interference signal are completely insignificant for the method according to the invention.

The basic idea of the inventive method is based on the assumption that the instantaneous interference signal for an arbitrarily selected DMT frame can be represented approximately as a sinusoidal signal with initially a still unknown amplitude and unknown phase. The spectrum of this sinusoidal signal directly represents the compensation signal for all frequencies. The idea on which the present invention is based consists, then, in the fact that the compensation signal for reducing the influence of an RFI interference signal on a transmitted data signal can be obtained with the aid of a normalized spectral function. The values of said normalized spectral function, that is to say the real part thereof and the imaginary part thereof, are stored. The compensation signal for each useful frequency then results as a complex product of the respectively stored normalized spectral function with a complex weighting coefficient. Said complex weighting coefficient is identical for all frequencies of a frame respectively considered, but has to be recalculated anew for each DMT frame. Said complex weighting coefficient depends on the spectral values that result after the FFT transformation in the observation interval (vicinity of the interference frequency, no useful signal).

One advantage of the present invention may be the fact that no knowledge whatsoever about the type, the profile and the properties of the interference signal need be present. It is merely necessary to know the spectral location at which the interference signal is situated and what bandwidth the interference signal has approximately. The method according to the invention therefore proves to be very simple and can, moreover, be implemented using very simple circuitry means or software means.

In this case, the interference may always be simulated by a sine function, even if the interference is configured in an arbitrarily different fashion. In this case, for the reduction or compensation of an interference, each frame is treated separately, that is to say that the absolute value and the phase of the RFI interference are in each case calculated anew for each frame. The compensation signal is then calculated for the respective frame taking account of the weighting coefficients respectively determined and on the basis of the normalized stored spectral function which simulates the sinusoidal interference and which also contains an item of information about the windowing used.

In this case, only the values at the edge of the observation interval may be used for the calculation of the complex weighting coefficient, but the values within the observation interval may not be used. In this case, it suffices to know that an interference is in proximity to a frequency in the observation interval. The sine function for reduction or for compensation of the interference signal is then calculated such that the values outside the observation interval are hit very well.

In this case, the knowledge about the position of the interference may be known a priori, for example if the type of interference is known, or be determined by means of a measurement, for example before the useful data are transmitted.

The number of carrier frequencies required for determining the compensation signal depends on several conditions:
 on the width of the observation window;
 on the type and intensity of the windowing used (interference decays more rapidly in the case of intense windowing);
 on the requirements (stipulations), for example from what dB threshold an interference is regarded as acceptable and thus noncritical;
 on the bandwidth of the interference.

In a restricted version of the inventive method a sinusoidal function is used as a basis for the normalized complex spectral function.

In a further restricted version of the inventive method, the complex weighting coefficient is calculated anew for each DMT frame.

In another restricted version of the inventive method, the compensation signal is subtracted from the received complex reception signal superposed with the interference signal. In this case, the compensation signal, prior to the subtraction, is preferably shifted into the correct spectral position predefined by the spectral position of the frequency maximum of the interference signal.

In a further restricted version of the inventive method, the spectral position of an interference signal situated in the current DMT frame is determined using the frequency maximum of said interference signal, it also being possible to use a different measure here. Typically, the absolute values and/or the squares of the absolute values of the carrier frequencies of the received data signal are monitored for this examination as to whether an interference signal is present in the current DMT frame.

The values of the complex spectral function may be stored in a memory.

The compensation signal may be calculated only for carriers of the data signal which lie outside the observation interval.

In a restricted version of the inventive method, only the two values of the spectral DMT reception signal at the edge of the observation interval are used for the calculation of the complex weighting coefficient and thus for the determination of the compensation signal.

In a further restricted version of the inventive method, the compensation signal is calculated only for those carrier frequencies outside the observation interval at which the absolute value of the interference power density of the interference signal and/or of the compensation signal lies above a predefined threshold. Said predetermined threshold lies for example in the range of between 60 dB and 45 dB, preferably at approximately 50 dB.

The invention may provide for the width of the observation interval used to be chosen in a manner dependent on the type of interference signal and/or on the type of windowing used.

The invention may provide for the width of the observation interval to be adjustable.

DESCRIPTION OF THE PREFERRED EMBODIMENTS

Figure 1:
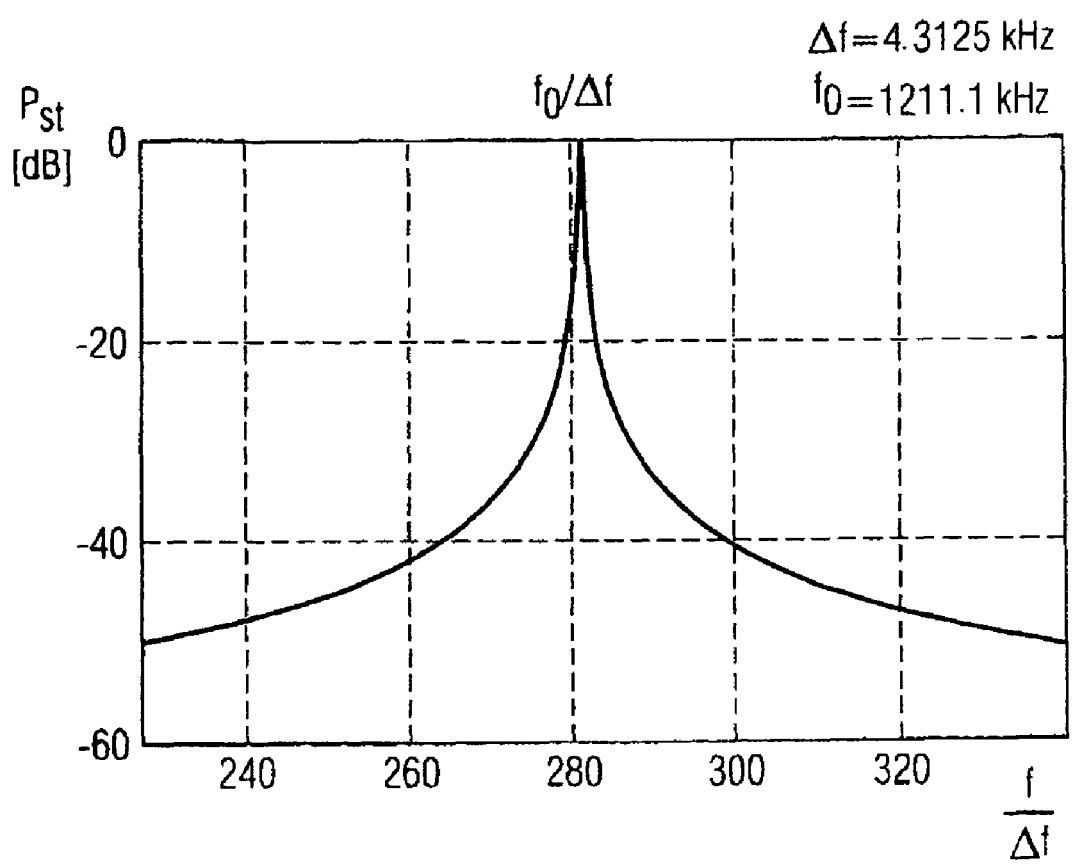
FIG. 1 shows the normalized power density Pst of an asynchronous interference signal after demodulation relative to the maximum value of the interference.

In all the Figures of the drawing, identical and functionally identical elements, signals and functions have been provided with the same reference symbols, unless specified otherwise.

Figure 2:
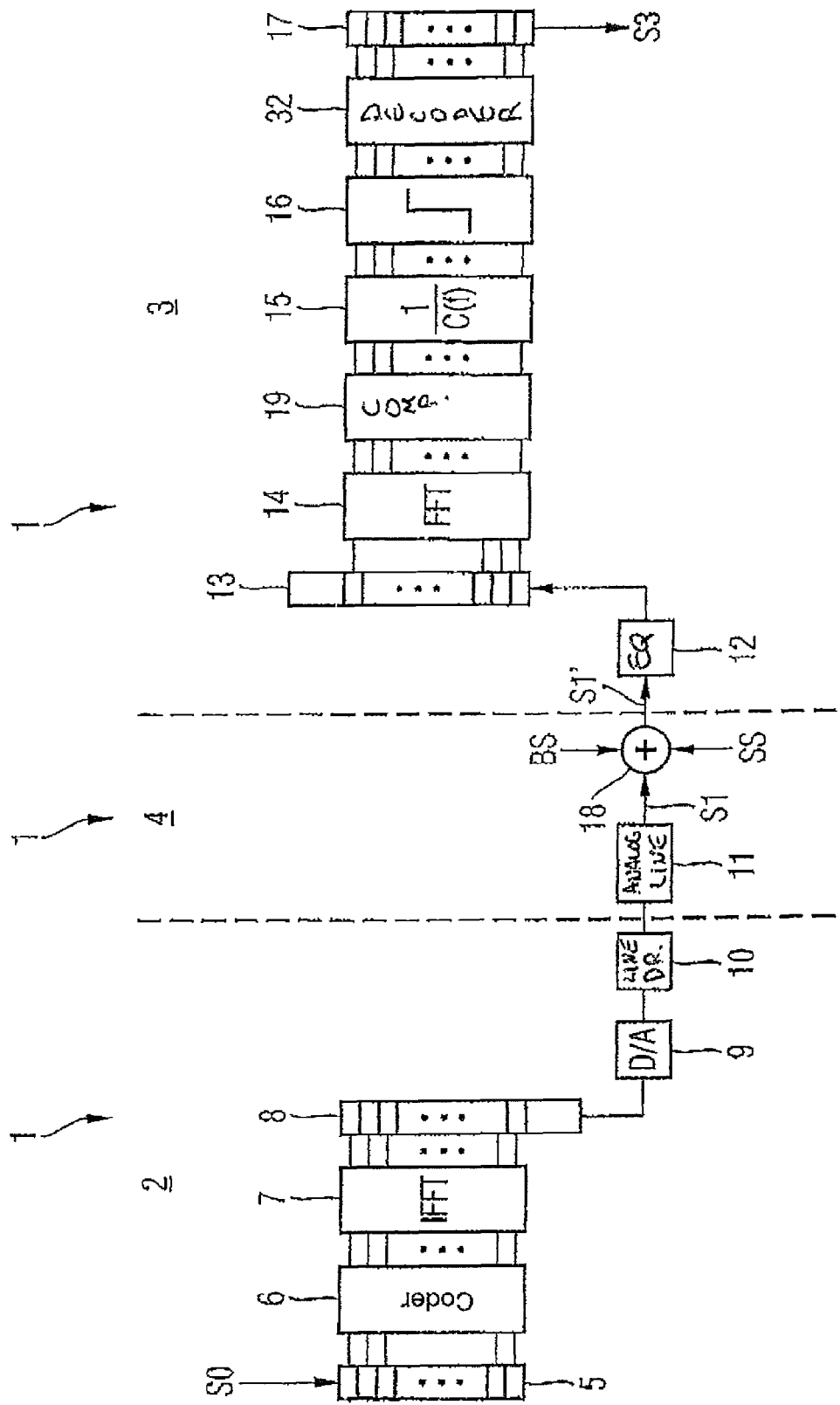
FIG. 2 shows a basic block diagram of a DMT transmission system according to the invention.

FIG. 2 shows a block diagram of a DMT transmission system according to the invention.

In FIG. 2, reference symbol 1 designates the DMT transmission system according to the invention, it being assumed hereafter that the DMT transmission system 1 is a so-called VDSL transmission system 1. The DMT data transmission system 1 comprises a transmitter-end part 2, a receiver-end part 3 and also a data transmission link 4 arranged between transmitter 2 and receiver 3. The transmitter 2 and also the receiver 3 may be subscriber terminals, for example, such as, by way of example, an analogue or digital telephone, a PC, a modem or the like. Even though only the transmission path is illustrated at the transmitter 2 and only the reception path is illustrated at the receiver 3, it goes without saying that they may, if appropriate, additionally also have a reception path and a transmission path, respectively. These have not been illustrated in FIG. 2, however, for the sake of clarity.

In the present exemplary embodiment, the transmitter 2 has a serial/parallel converter 5, to which the data signals S0 to be transmitted are applied on the input side. Arranged in a manner connected downstream of the serial/parallel converter 5 are, one after the other, a coder 6, an IFFT block 7, a parallel/serial converter 8, a digital/analogue converter 9 and a line driver 10. In this case, the line driver 10 forms the transmitter-end physical interface of the transmitter 2 with respect to the data transmission line 4, which essentially has an analogue line 11, also referred to as a channel. After coding, that is to say at the output of the coder 6, the data to be transmitted are present in the form of frequency points. The latter are subjected to an inverse Fast Fourier Transformation in the IFFT block 7 and are subsequently converted into a serial data stream in the parallel/serial converter 8.

The receiver 3 has an equalizer 12 on the input side, said equalizer forming the receiver-end physical interface with respect to the data transmission link 4. Connected downstream of the equalizer 12, on the output side, are a serial/parallel converter 13, an FFT block 14, an equalizer 15, a decision unit 16, a decoder 32 and also a parallel/serial converter 17. The equalizer 15 performs an equalization of the received data signals in the frequency domain and, since the data transmission is typically not ideal, the decision unit 16 connected downstream performs an assignment of the correct data values. On the output side of the parallel/serial converter 17, the received data signals S2 are then present in correspondingly conditioned serial form.

It should be noted at this juncture that the construction of the transmitter 2 and of the receiver 3 has mainly been illustrated schematically in FIG. 2 and does not lay claim to completeness. In particular, it goes without saying that a transmitter 2 may additionally have, on the output side of the IFFT device 7, a transmission filter and, if appropriate, a circuit arrangement for crest factor reduction and that an analogue filter may be provided, if appropriate, downstream of the digital-to-analogue converter 9. Moreover, an analogue filter, an analogue-to-digital converter, an addition device and also a reception filter are typically provided directly downstream of the equalizer 12 in the receiver 3.

The data signal 1 which is transmitted via the channel 11 and is intended to correspond to the data signal S0 coupled in on the input side is typically superposed with an interference signal of greater or lesser intensity. In the example shown, said interference signal may be a narrowband interference signal SS and/or a broadband interference signal BS. These interference signals BS, SS are superposed on the transmitted data signal S1 in the channel 11, which is indicated by the block 18 in FIG. 2. The transmitted data signal S1' coupled into the equalizer 12 is thus superposed with an interference signal BS, SS in comparison with the signal S1 output on the output side of the line driver 10.

In order at least to reduce or ideally to completely compensate for this interference signal BS, SS in the receiver 3, the receiver 3 has a compensation device 19 according to the invention. It is typically the case here that 100% compensation is not effected, but rather merely a reduction of the influence of the interference signal BS, SS.

In the present exemplary embodiment, the compensation device 19, which is referred to hereinafter as RFI compensator 19 for short, is arranged in a manner connected directly downstream of the FFT block 14, but it would also be conceivable for the RFI compensator 19 to be connected downstream of the equalizer 15. The construction and the functioning of said RFI compensator 19 are described in detail below.

Figure 3:
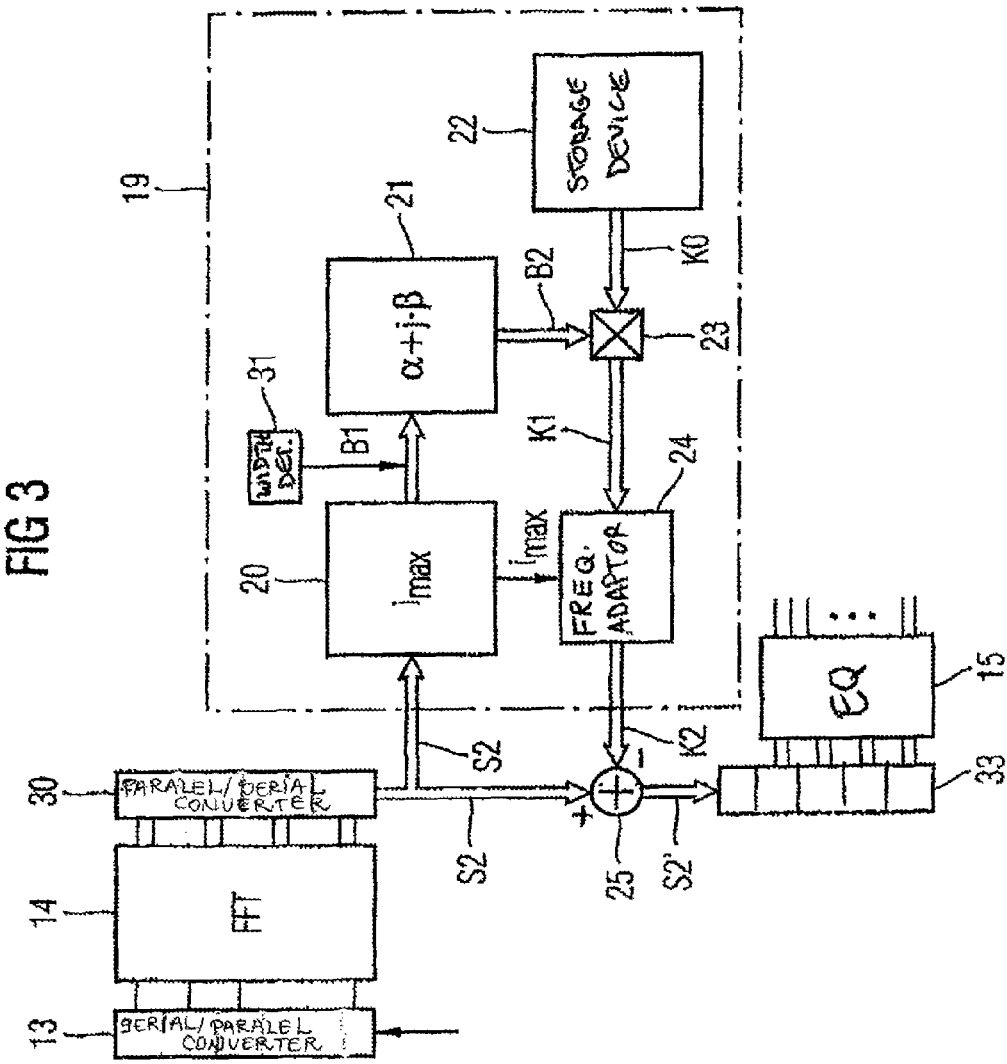
FIG. 3 shows a block diagram for an RFI compensator according to the invention.

FIG. 3 shows the block diagram for an RFI compensator according to the invention. The double lines depicted in FIG. 3 are intended to illustrate that the respective signals are complex signals comprising a real part and an imaginary part.

In FIG. 3, a parallel/serial converter 30 is connected downstream of the FFT block 14 and converts the complex values present in parallel on the output side of the FFT block 14 into a serial data stream S2. The RFI compensator 19 is arranged directly downstream of said parallel/serial converter 30, so that the serial data signal S2 is fed to the RFI compensator 19 on the input side. The RFI compensator 19 has a device 20 for identifying an interference signal superposed on the data signal S2. For this purpose, the complex data signal S2 is firstly coupled into the device 20. The device 20 identifies whether a narrowband interference signal is superposed on said signal S2 within a specific frame. In the case where a narrowband interference signal is present in the signal S2, the device 20 determines the approximate position of the frequency maximum $i_{max}$ of said interference signal—relative to the frame respectively considered.

Arranged in a manner connected downstream of the device 20 is a device 21, which serves for determining the complex weighting coefficient $\alpha+j\cdot\beta$ in accordance with the invention. In this case, said complex weighting coefficient is determined only for those carrier frequencies in the received signal S2 whose values lie within a predefined observation interval B1. The complex weighting coefficient $\alpha+j\cdot\beta$ then always remains the same for the frame respectively considered, but is again determined anew for each frame. The width of the observation interval B1 that is placed around the frequency maximum $i_{max}$ of the interference is predefined by a block 31. The width of the observation interval B1 denotes how many values (carrier frequencies) the observation interval B1 has. The width of the observation interval B1 can advantageously be set in a manner dependent on the requirements and, for example, on the windowing used.

The RFI compensator 19 furthermore contains a storage device 22, in which is stored in each case a normalized spectral function, for example a spectrum of a normalized sine function, in the form of a multiplicity of discrete values. Said normalized spectral function is identical for all the carrier frequencies of the transmitted data signal S2. The normalized spectral function also contains, in particular, an item of information about the type of windowing used and also the intensity thereof. It would also be conceivable for more than one type of windowing to be used, but it would then be necessary to store a corresponding number of normalized spectral functions in the memory. In the case of a symmetrical normalized function, such as the spectrum of the sine function, for example, it is possible, on account of the symmetry thereof, to dispense with half of the values, thereby significantly reducing the requisite memory requirement.

The complex weighting coefficient $\alpha+j\cdot\beta$ determined in the device 21 is multiplied, in a combination device 23, a multiplier 23, by the corresponding values of the normalized spectral function stored in the storage device 22. Since the complex weighting coefficient $\alpha+j\cdot\beta$, as well as the values K0 of the normalized spectral functions, are complex values comprising a real part and an imaginary part, a total of four multiplications have to be performed for each frequency. From the results obtained by the multiplications, it is possible—as will be explained thoroughly below—to calculate a normalized compensation signal K1 available on the output side of the combination device 23.

In order to compensate for or at least reduce the interference superposed on the signal S2 by means of this normalized compensation signal K1, the latter has to be shifted to the corresponding point of the carrier frequency. For this purpose, the RFI compensator 19 furthermore has a device 24, to which are fed, on the input side, the normalized compensation signal K1 and also an item of information about the position of the frequency maximum $i_{max}$, which is obtained in the device 20. In the device 24, the compensation K1 is then adapted to the respective interference frequency, so that a compensation signal K2 correspondingly adapted to the position of the interference frequency is present on the output side.

A combination device 25 is furthermore provided, which is formed as an addition device (or as a subtraction device) in the present example. The received serial signal S2 superposed with an interference signal and the serial compensation signal K2 provided with a negative sign are fed to the combination device 25 on the input side. The signals S2, K2 are likewise complex values in this case. Subtracting the compensation signal K2 from the signal S2 produces the complex data signal S2' on the output side, said complex data signal being at least reduced with regard to the superposed interference. This data signal S2' present in serial fashion is fed to a serial-parallel converter 33 on the output side, which converts said data signal S2' into a parallel data stream for the block 15 connected downstream.

For the generation of the compensation signal K1, it is assumed that the carrier frequencies closely in the vicinity of a narrowband interference signal are not utilized for the data transmission. After the FFT transformation, an examination is firstly undertaken in this so-called observation interval region, that is to say closely in the vicinity of the interference signal, to ascertain whether or not an interference signal is present in the corresponding received DMT frame signal. This can be performed by monitoring the absolute values or the squares of the absolute values. In this case, the position of the maximum defines the spectral position of the narrowband interference signal contained in the received DMT frame. The spectral values directly before and after said maximum (relative to the frequency) serve as measured values for the generation of the compensation signal. If a number of Δ values before and Δ values after the maximum are used, then a number of 2·Δ+1 values are obtained overall, with the aid of which the complex weighting coefficient α+j·β can be calculated. Said Δ values before and Δ values after the maximum define the observation interval. These values within the observation interval do not contain any useful information, however. The compensation signal K1 for the current DMT frame is obtained by complex multiplication of a normalized compensation signal K0, which is read for example from a memory 22 specifically provided therefore, by the complex weighting coefficient α+j·β. In this case, a total of four real multiplications are required for each carrier frequency to be compensated. Before the final subtraction of the compensation signal from the received signal S2 in the combination device 25, the compensation signal K1 thus obtained still has to be shifted into the correct spectral position defined by the spectral position $i_{max}$ of the interference spectrum or of the interference signal.

The method according to the invention for obtaining the complex weighting coefficients α+j·β and also the compensation signal K2 is explained in more detail below on the basis of an example. The example is based on a data transmission in accordance with the VDSL standard and a correspondingly configured DMT receiver. The frequency spacing here is Δf=4.3125 kHz:

Firstly, the values for the normalized spectral function K0 are calculated, which are stored in the memory 22. The length of the spectral function to be stored and thus the compensation range of the interference signal is $$N+1=2^n+1$$

This length need not necessarily match the FFT length of the DMT transmission system, since the compensation of a single narrowband interference signal indeed does not have to be affected over the entire wide frequency range. In the present example, a value of 512 is assumed for N, and so the maximum compensation range is N+1=513. By contrast, a maximum of 4097 spectral values (carriers) are provided in the case of VDSL for the FFT transformation. In practical applications, the compensation length can be reduced further—depending on the choice of the windowing used in the FFT transformation in the receiver, in the observation interval and also for the desired quality of the compensation. Said windowing has a very great influence on the decay behaviour of the narrowband interference with respect to adjacent frequencies. A rectangular windowing shall be assumed below, but it is also possible to use any other windowing that is desired, provided that this is permitted by the standard (such as in the case of VDSL) of the data transmission.

Firstly, the two following real time-discrete signal vectors $$u_a(k) = \cos\left(2\cdot\pi\cdot x_0 \cdot \frac{k}{2\cdot N}\right),$$

$$u_b(k) = \sin\left(2\cdot\pi\cdot x_0 \cdot \frac{k}{2\cdot N}\right)$$

where $$k=0, 1, \ldots, 2\cdot N-1$$

are defined and transformed into the frequency domain with the aid of an FFT. N+1 complex frequency values $U_a(\mu)$ and $U_b(\mu)$ where (μ)=0, 1, . . . , N are then obtained.

With the exception of 0, it is possible to choose a value of between −1 and +1 for the frequency $x_0$ of the two basis functions. Examinations have shown that this value for $x_0$=0.25 proves to be particularly favourable.

Figure 4:
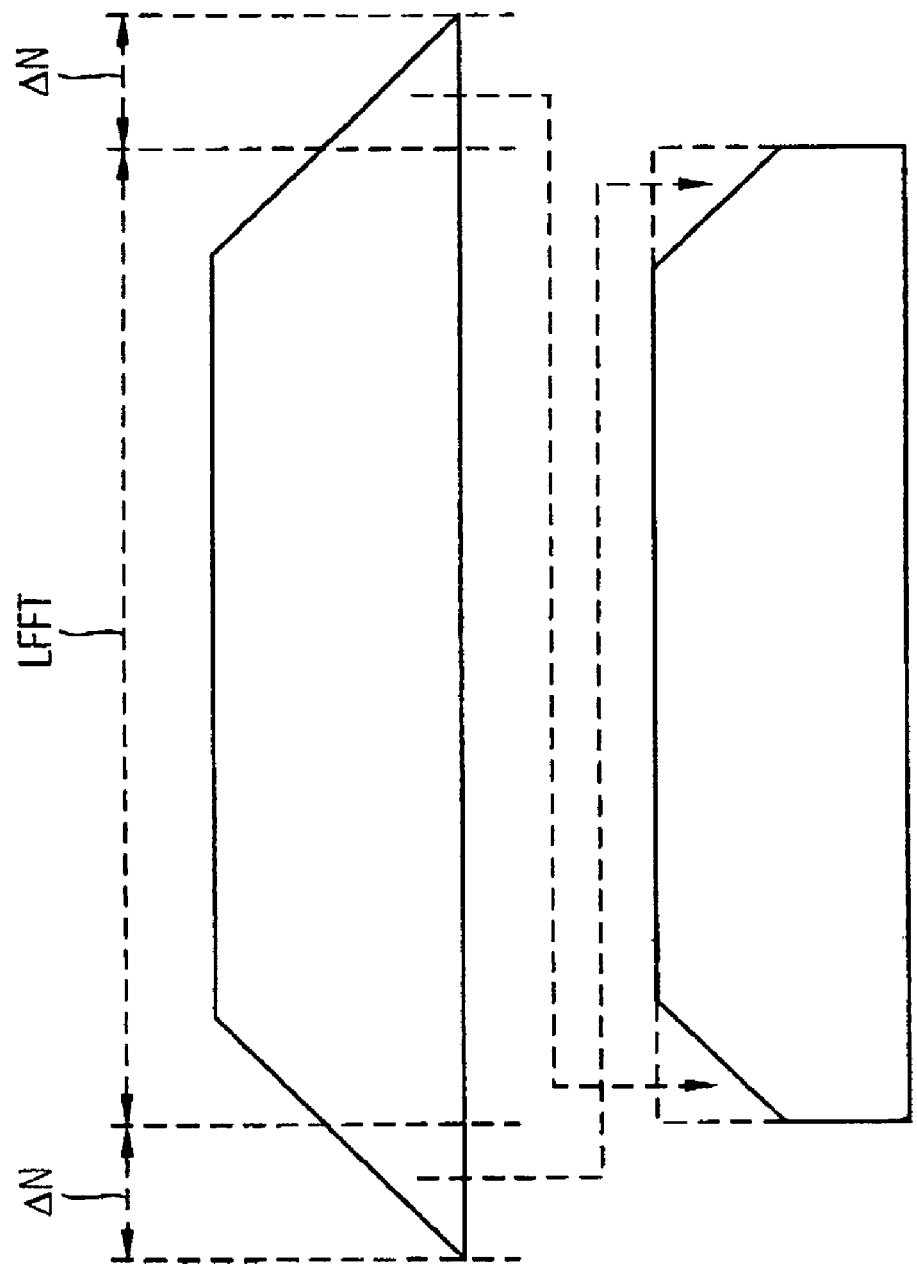
FIG. 4 shows a graphical representation of the windowing operation prior to the FFT in the receiver.

If the demodulation involves carrying out a windowing of the received DMT frames, in the way that is possible in principle in the case of VDSL, then the two signal vectors defined above are likewise to be subjected to this windowing operation before the FFT is carried out. FIG. 4 shows a graphical illustration of such a windowing operation which is performed before the FFT in the receiver. LFFT designates the FFT length of a frame. ΔN designates the width and thus the intensity of the windowing used. If an intense windowing and thus a large value for ΔN are used, then interference decays more rapidly.

The DMT frame, which, in the case of VDSL, has been extended by a prefix and a suffix in a known manner at the transmission end, is firstly multiplied by a window function illustrated by way of example in FIG. 4. The signal vector is therefore to be extended by 2·ΔN values. After the weighting with this window function, the values at the end of the windowed DMT frame are to be added to the values at the FFT frame start and the values at the start of the windowed frame are to be added to the values at the FFT frame end, as is illustrated in FIG. 4.

When windowing is employed in the receiver, firstly $2 \cdot \Delta N + 2 \cdot N$ values have to be calculated for the two sine and cosine signal vectors defined above. After the window operation has been carried out, signal vectors having the length $2 \cdot N$ are once again produced, which can be transformed into the frequency domain in a customary manner with the aid of the FFT.

The windowing thus effects a faster decay of the interference influencing within an FFT frequency frame on the frequency axis. In this case, the interference also decays more rapidly with a rising overlap region.

The position of the centre frequency for the spectral function to be stored is subsequently defined with $$i_0 = \frac{N}{2}.$$

From the two basis spectral functions $U_a(\mu)$ and $U_b(\mu)$, firstly the two bandpass functions $$X(\mu) = \begin{cases} U_a(i0-\mu)^* + j \cdot U_b(i0-\mu)^* & \text{for } \mu < i_0 \\ U_a(\mu - i_0) + j \cdot U_b(\mu - i_0) & \text{for } \mu \geq i_0 \end{cases}$$

$$Y(\mu) = \begin{cases} U_b(i0-\mu)^* - j \cdot U_a(i0-\mu)^* & \text{for } \mu < i_0 \\ U_b(\mu - i_0) - j \cdot U_a(\mu - i_0) & \text{for } \mu \geq i_0 \end{cases}$$

are calculated and these are used to calculate the normalized complex spectral function to be stored $$S(\mu) = X(\mu) + j \cdot Y(\mu) \text{ for } \mu = 0, 1, \ldots, N,$$

which is composed of the real subfunction $$S_R(\mu) = \text{Re}\{X(\mu)\} - \text{Im}\{Y(\mu)\}$$

and the imaginary subfunction $$S_I(\mu) = \text{Im}\{X(\mu)\} + \text{Re}\{Y(\mu)\}$$

that is to say $$S(\mu) = S_R(\mu) + j \cdot S_I(\mu).$$

( )* above in each case denotes the complex conjugate values.

In order to compensate for or in order to reduce the narrowband interference signal, firstly the position of the centre frequency $i_{max}$ of the narrowband interference signal is determined. For this purpose, it is necessary to form the squares of the absolute values for the complex reception values in the expected frequency range and to find out the spectral position of the maximum $i_{max}$. In order to generate the compensation signal, firstly the values in the observation frequency range of $i_{max}-\Delta$ and $i_{max}+\Delta$ are then accepted and processed further. In this case, the value $\Delta$ defines the length of the observation interval. The latter is dependent on the expected bandwidth of the narrowband interference and is predefined as a priori information.

With the frequency values determined for an arbitrary DMT frame in the observation region, a complex weighting coefficient is then determined in such a way that—after said weighting coefficient is multiplied by the stored spectral function—the same values as for the narrowband interference result in the entire frequency range. In this case, a best possible match should result outside the observation region, in particular, since the observation region cannot be compensated for itself by means of this method and, therefore, there is no need for a match to be present here either.

It is evident that this can best be achieved if only the edges of the observation interval are examined, so that a best possible match of the stored spectral function with the interference spectrum at the edges of the observation interval is thus demanded. Therefore, the further processing does not require all the values in the observation interval, but merely the two values at the edge of the observation interval, that is to say the $V(i_{max}-\Delta)$ and $V(i_{max}+\Delta)$, where $V(\mu)$ designates the frequency values after the FFT.

In order to determine the complex weighting coefficient $\gamma = \alpha + j \cdot \beta$; representing an interference spectrum and comprising the as yet unknown real part $\alpha$ and the as yet unknown imaginary part $\beta$, a system of equations is then established. The real part $V_R$ and imaginary part $V_I$ are each to be taken into account individually in this case. The two measured values at the edge of the observation region are designated as follows:

$$V(i_{max}-\Delta) = V_R(i_{max}-\Delta) + j \cdot V_I(i_{max}-\Delta)$$

$$V(i_{max}+\Delta) = V_R(i_{max}+\Delta) + j \cdot V_I(i_{max}+\Delta)$$

The following system of equations is produced:

$$\begin{bmatrix} S_R(i0-\Delta) & -S_I(i0-\Delta) \\ S_R(i0+\Delta) & -S_I(i0+\Delta) \\ S_I(i0-\Delta) & S_R(i0-\Delta) \\ S_I(i0+\Delta) & S_R(i0+\Delta) \end{bmatrix} \cdot \begin{bmatrix} \alpha \\ \beta \end{bmatrix} = \begin{bmatrix} V_R(i_{max}-\Delta) \\ V_R(i_{max}+\Delta) \\ V_I(i_{max}-\Delta) \\ V_I(i_{max}+\Delta) \end{bmatrix}$$

or, written compactly, $$\underline{S} \cdot \underline{\gamma} = \underline{V}$$

the underlined quantities representing matrices or vectors.

Thus, a total of four equations are obtained for the two unknown real quantities $\alpha$ and $\beta$. The demanded match at the edges of the observation region thus cannot be complied with exactly. A solution can be obtained only with deviations being tolerated. Therefore, the above defining equation is extended by an error vector $\delta$, which can be then be minimized, as follows:

$$\underline{S} \cdot \underline{\gamma} = \underline{V} + \underline{\delta},$$

When solved for the error vector, the objective function F results as follows:

$$F = \underline{\delta}^T \cdot \underline{G} \cdot \underline{\delta},$$

where the weight matrix G represents a 4×4 diagonal matrix having the diagonal values $g_1, g_2, g_3, g_4$ and the superscript T designates the transposing operator. The objective function F represents a scalar function depending on the components of the error vector. Consequently, the following relationship results for the objective function F:

$$F = g_1 \cdot \delta_1^2 + g_2 \cdot \delta_2^2 + g_3 \cdot \delta_3^2 + g_4 \cdot \delta_4^2$$

Consequently, a weighted sum of the square deviations results as the objective function F. The objective function F can be minimized and the following relation is obtained for the vector $\underline{\gamma}$ sought with the two components $\alpha$, $\beta$:

$$\underline{\gamma}=[\underline{S}^T \cdot \underline{G} \cdot \underline{S}]^{-1} \cdot \underline{S}^T \cdot \underline{G} \cdot \underline{V}$$

or, written compactly, $$\underline{\gamma}=\underline{B} \cdot \underline{V},$$

where $$\underline{B}=[\underline{S}^T \cdot \underline{G} \cdot \underline{S}]^{-1} \cdot \underline{S}^T \cdot \underline{G}$$

In this case, B represents a matrix having two rows and four columns, the coefficients of which can be calculated from the values of the stored spectral function S and the weight coefficients $g_1$ to $g_4$ of the weight matrix G. When prescribing the observation region defined by the value $\Delta$ and the coefficients $g_1$-$g_4$, the coefficients of the matrix B need only be calculated once. The components $\alpha$, $\beta$ of the complex weighting coefficient $\delta$ sought are then obtained by means of the relations:

$$\alpha=b_{1,1} \cdot V_R(i_{max}-\Delta)+b_{1,2} \cdot V_R(i_{max}+\Delta)+b_{1,3} \cdot V_I(i_{max}-\Delta)+b_{1,4} \cdot V_I(i_{max}+\Delta)$$

$$\beta=b_{2,1} \cdot V_R(i_{max}-\Delta)+b_{2,2} \cdot V_R(i_{max}+\Delta)+b_{2,3} \cdot V_I(i_{max}-\Delta)+b_{2,4} \cdot V_I(i_{max}+\Delta)$$

Consequently, four real multiplications in each case have to be carried out for the calculation both of the real part $\alpha$ and for the calculation of the imaginary part $\beta$ of the complex weighting coefficient $\gamma=\alpha+j\cdot\beta$.

It should also be noted at this point that the following relationship exists between the components of the second row vector and the coefficients of the first row vector of the matrix B:

$$b_{2,3}=b_{1,1},$$

$$b_{2,4}=b_{1,2},$$

$$b_{2,1}=b_{1,3},$$

$$b_{2,2}=b_{1,4}.$$

The compensation signal $Y_K(\mu)=K2$, which has to be subtracted from the received FFT vector S2, is finally obtained by means of the relation $$Y_K(\mu)=[S_R(\mu-\Delta i) \cdot \alpha - S_I(\mu-\Delta i) \cdot \beta]+j \cdot [S_I(\mu-\Delta i) \cdot \alpha + S_R(\mu-\Delta i) \cdot \beta]$$

In this case, $\Delta i$ designates the shift in the centroid frequency of the narrowband interference signal from the centroid frequency of the stored spectral function $$\Delta i = i_{max}-i_0$$

Figure 5:
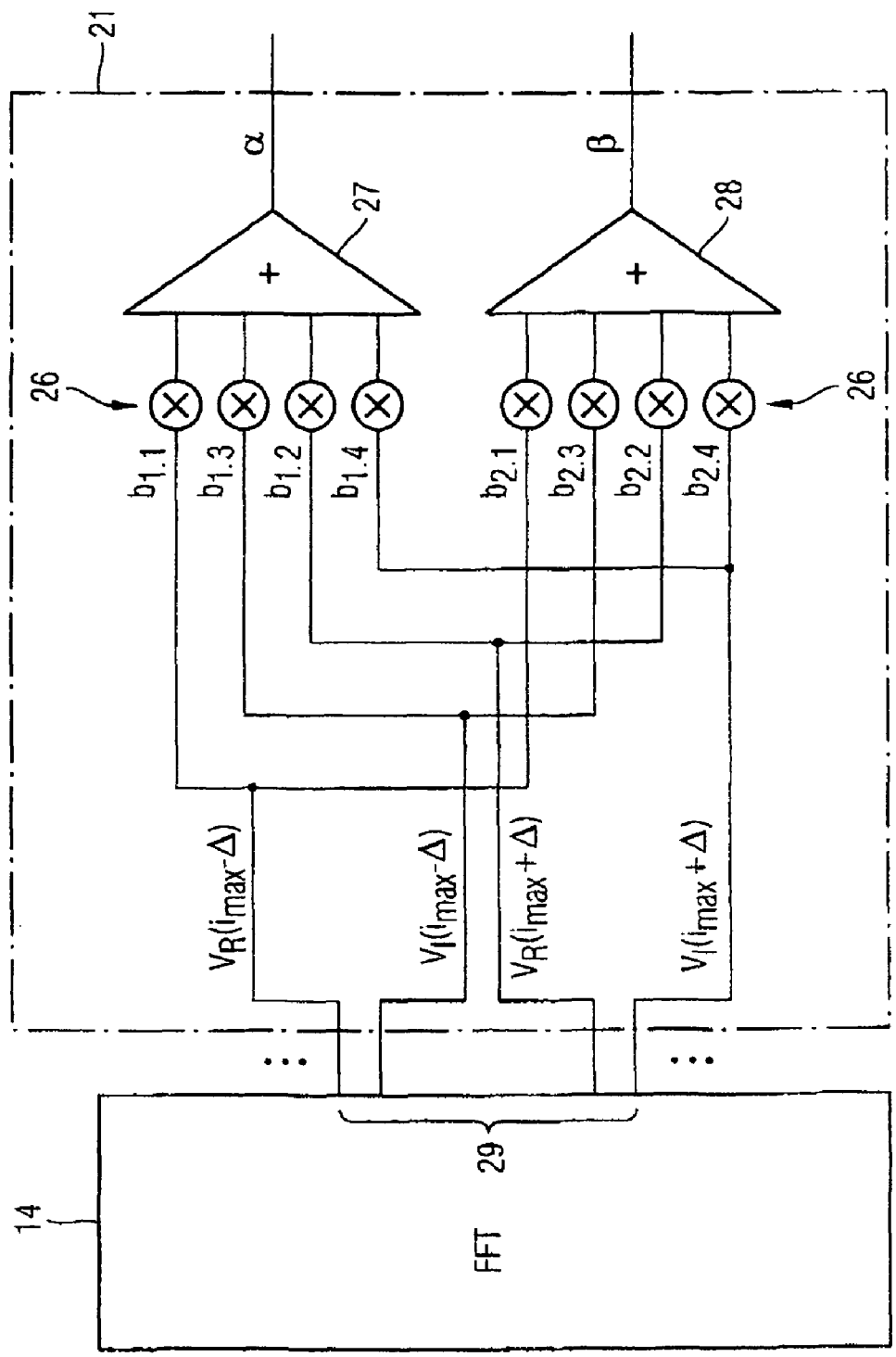
FIG. 5 shows a block diagram of an arrangement according to the invention for calculating the complex weighting coefficient $\gamma = \alpha + j \cdot \beta$.

FIG. 5 shows a block diagram of an arrangement 21 according to the invention for calculating the complex weighting coefficient $\gamma=\alpha+j\cdot\beta$, as has been described above.

The observation interval within which the carrier frequencies are observed is designated by reference symbol 29 in FIG. 5. In this case, in a preferred refinement of the invention, however, only the two complex values at the two edges of the observation interval ($\pm\Delta$) are considered, that is to say overall the two real parts $V_R(i_{max}+\Delta)$, $V_R(i_{max}-\Delta)$ and the two imaginary parts $V_I(i_{max}+\Delta)$, $V_I(i_{max}-\Delta)$.

Although it is also possible, in principle, additionally to use further complex values within the observation interval for the calculation of the complex weighting coefficient $\gamma=\alpha+j\cdot\Delta$, in the first place this makes the calculation extremely complex and more complicated. Moreover, it has been shown that this tends to make the results worse. In particular, the applicant has gained the insight that the values at the edges have the greatest information about the respective interference outside the observation interval. By contrast, the further values within the observation interval have less information about the respective interference and, accordingly, are also not as well suited to simulating the interference.

The multiplication of the components of the matrix B by the corresponding components of the matrix V in accordance with the above equations is effected using multiplication devices 26. Furthermore, the addition of the products obtained from these multiplications is effected in a respective addition device 27, 28, the real part and thus the coefficient $\alpha$ being present at the output of the first addition device 27 and the imaginary part and thus the coefficient $\beta$ of the complex weighting coefficient $\gamma=\alpha+j\cdot\beta$ being present at the output of the second addition device 28.

The method according to the invention can also be modified as follows. The residual error can be reduced further and the interference suppression can thus be improved if the method works with different complex $\gamma$ values for the frequency range below and above the centroid frequency $i_{max}$ of the interference. The error at the upper edge of the observation region is weighted to a lesser extent for the purpose of calculating the $\gamma$ value below the interference centroid frequency, and the error at the lower edge is weighted to a lesser extent for the purpose of calculating the $\gamma$ value above the centroid frequency. The two weight matrices G1, G2 are thus defined as follows:

$$G1 = \begin{bmatrix} 1 & 0 & 0 & 0 \\ 0 & g_1 & 0 & 0 \\ 0 & 0 & 1 & 0 \\ 0 & 0 & 0 & g_1 \end{bmatrix},$$

$$G2 = \begin{bmatrix} g_2 & 0 & 0 & 0 \\ 0 & 1 & 0 & 0 \\ 0 & 0 & g_2 & 0 \\ 0 & 0 & 0 & 1 \end{bmatrix},$$

in which case the following should hold true for the coefficients $g_1$, $g_2$:

$$g_1, g_2 \leq 1.$$

The following relationship is thus obtained for the matrices B1, B2:

$$\underline{B1}=[\underline{S}^T \cdot \underline{G1} \cdot \underline{S}]^{-1} \cdot \underline{S}^T \cdot \underline{G1},$$

$$\underline{B2}=[\underline{S}^T \cdot \underline{G2} \cdot \underline{S}]^{-1} \cdot \underline{S}^T \cdot \underline{G2}$$

These are used to obtain the two complex coefficients $\gamma 1$, $\gamma 2$ for frequencies below the interference centroid frequency ($\gamma 1$) and for frequencies above the interference centroid frequency ($\gamma 2$) as follows:

$$\gamma 1=\underline{B1} \cdot \underline{V}$$

$$\gamma 2=\underline{B2} \cdot \underline{V}$$

The effectiveness and the advantages of the above-described compensation method according to the invention are described below on the basis of some simulation examples that were carried out by the applicant.

For the simulation, DMT frames are generated in the time domain, said frames containing only interference signals, but no useful data, for the purpose of better being able to check the effectiveness of the method according to the invention.

Said DMT frames are weighted with a suitable window function, transformed into the frequency domain by means of FFT, and used as input signals for the RFI compensator.

The narrowband interference signal $u_{RFI}(k)$ is calculated in the following manner:

$$u_{RFI}(k) = g \cdot \cos\left(2 \cdot \pi \cdot \frac{f_0}{f_A} \cdot k\right) + (1-g) \cdot \left(u_{TP}(k) \cdot \cos\left(2 \cdot \pi \cdot \frac{f_0}{f_A} \cdot k\right) + \ldots\right)$$

$$\left(\ldots + m \cdot H(u_{TP}(k)) \cdot \sin\left(2 \cdot \pi \cdot \frac{f_0}{f_A} \cdot k\right)\right)$$

In this case, the signal $u_{TP}(k)$ represents a narrowband baseband noise signal (low-pass filter signal). $H(u_{TP}(k))$ designates the Hilbert transform of the noise signal $u_{TP}(k)$. k designates the time index, $f_0$ designates the carrier frequency of the amplitude modulation, and $f_A$ designates the sampling frequency of the time-discrete narrowband noise signal.

The most important applications can be simulated through suitable choice of the parameters g and m:

1st Application:
  0<g<1, m=0; double-sideband amplitude modulation, with carrier; application primarily medium-wave and short-wave radio broadcasting.

2nd Application:
  g=0, m=1; single-sideband amplitude modulation without carrier, upper sideband; application primarily amateur radio.

3rd Application:
  g=0, m=−1; single-sideband amplitude modulation without carrier, lower sideband; application primarily amateur radio.

The simulation examples are in each case based on a block length of N=513 complex frequency values and 1024 real time values and a frequency spacing of Δf=4.3125 kHz. Before the FFT transformation at the reception end, a windowing was carried out, where ΔN=4 was in each case chosen as the overlap region.

It was additionally superposed on the narrowband noise signal in each case a broadband white noise signal having a signal power 60 dB lower. The carrier frequency for the amplitude modulation is in each case 264.4·Δf, that is to say correspondingly 1139.79 kHz.

In order to calculate the complex coefficients below and above the interference centroid frequency, the values g1=g2=0.75 were chosen for the two weight factors g1, g2 of the respective weight matrices G, G2. The numerical values $$B1 = \begin{pmatrix} 1.5685 & -1.51265 & 1.58786 & -1.53133 \\ -1.58786 & 1.53133 & 1.5685 & -1.51265 \end{pmatrix},$$

$$B2 = \begin{pmatrix} 1.09641 & -1.87978 & 1.10995 & -1.90299 \\ -1.10995 & 1.90299 & 1.09641 & -1.87978 \end{pmatrix}$$

result for the two matrices B1, B2. In the simulation, the errors were determined on the basis of 256 received FFT frames.

Figure 6A:
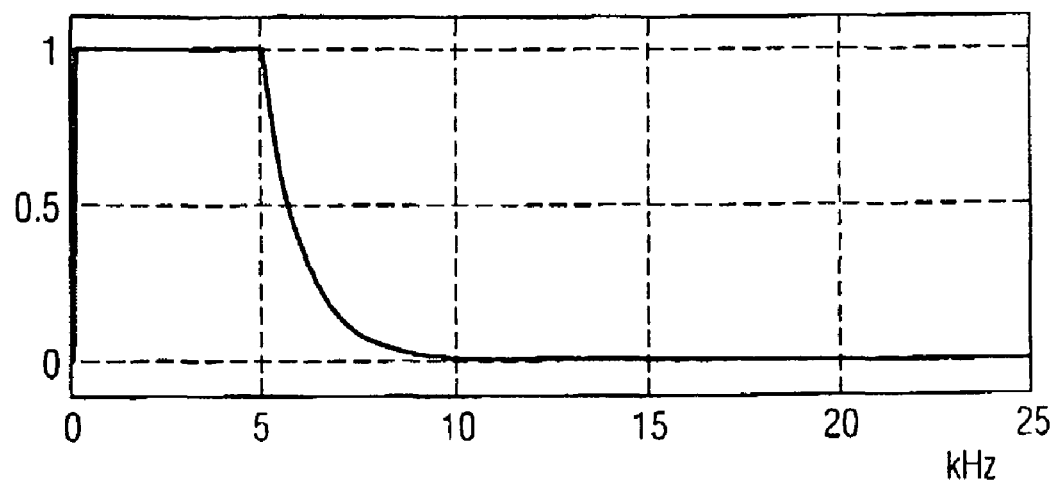
FIG. 6 shows a narrowband noise signal (simulation Example 1: double-side band amplitude modulation with carrier adjunct)
Figure 6B:
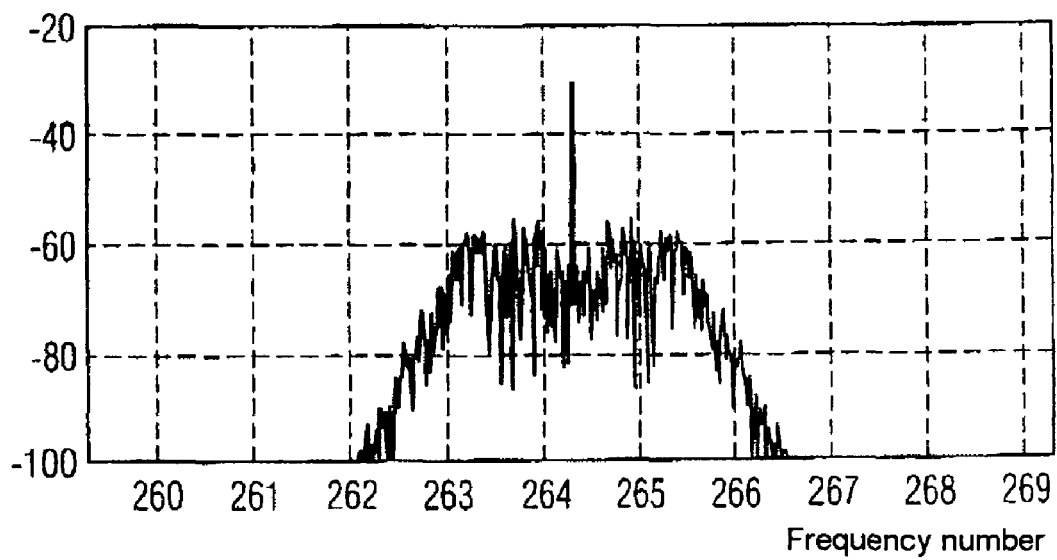
Figure 6C:
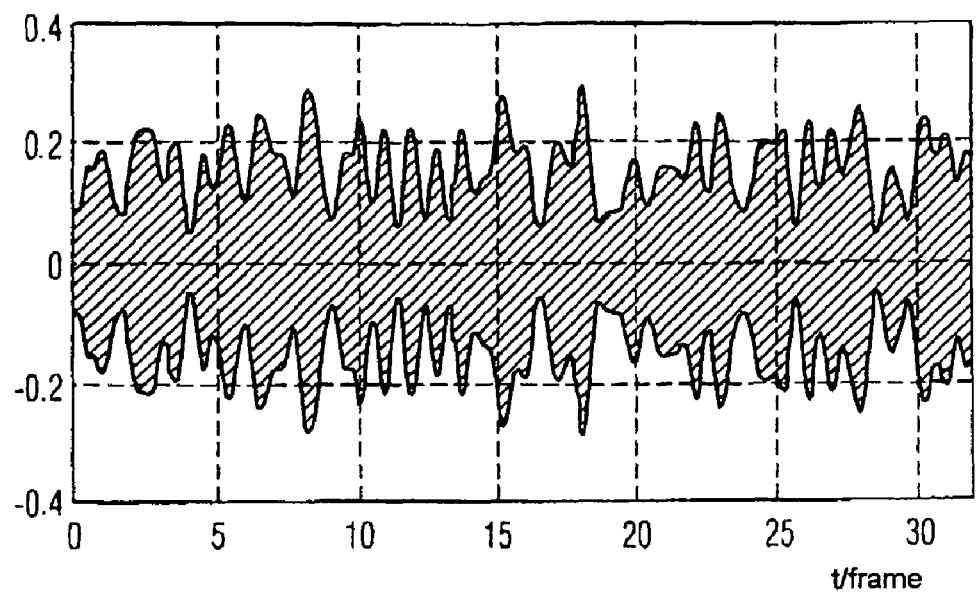

FIG. 6 shows a narrowband noise signal for the first application mentioned above. In FIG. 6(a), an amplitude-modulated band-limited noise signal (low-pass filter) was considered as narrowband noise. The spectral distribution of the noise signal is illustrated in FIG. 6(b). FIG. 6(c) furthermore illustrates an exert from the time signal of the narrowband noise signal.

Figure 7A:
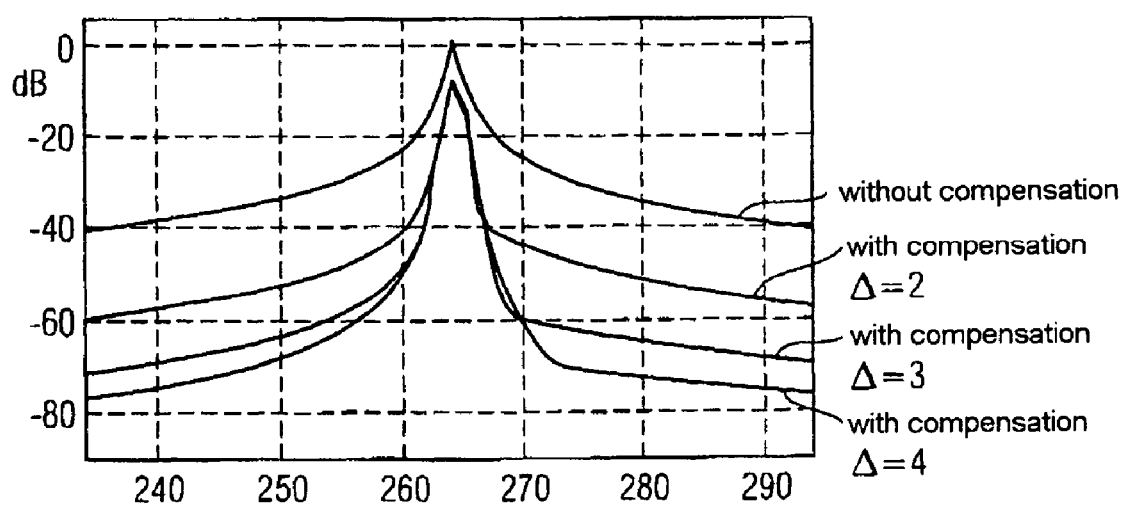
FIG. 7 shows the interference power density after the demodulation (FFT) without and with RFI compensation for simulation Example 1.
Figure 7B:
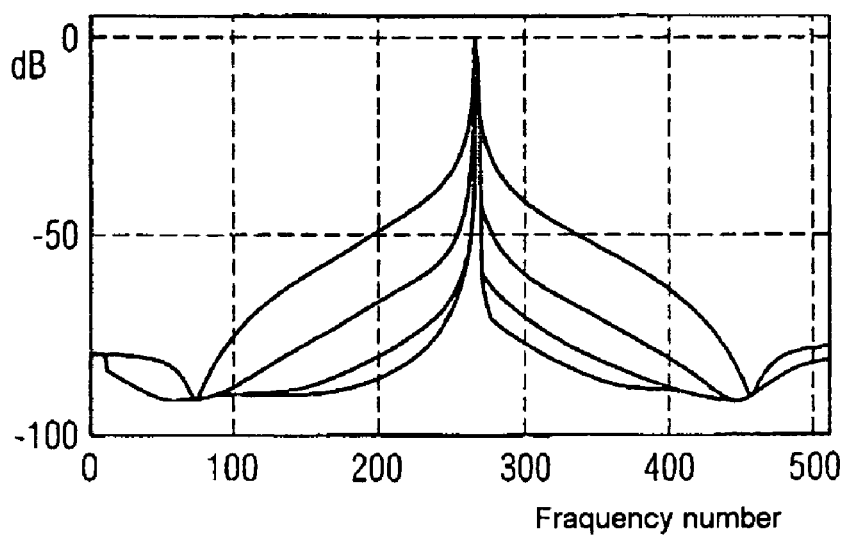

FIG. 7 shows the simulation results of the interference power density after the demodulation (FFT) for the first application in the case of a noise signal corresponding to FIG. 6 without compensation (topmost graph) and with compensation for different observation regions (Δ=2, 3, 4). It is evident that as the width of the observation region increases, that is to say as Δ rises, the narrowband noise can be compensated for better.

This also holds true for other interference scenarios, as shown by the following two examples (applications 2 and 3). Here a narrowband single-sideband-amplitude-modulated signal without a carrier adjunct was chosen as the interference signal. In this case, the lower sideband was selected in application 3 (FIGS. 8, 9) and the upper sideband was selected in application 2 (FIGS. 10, 11).

Figure 8A:
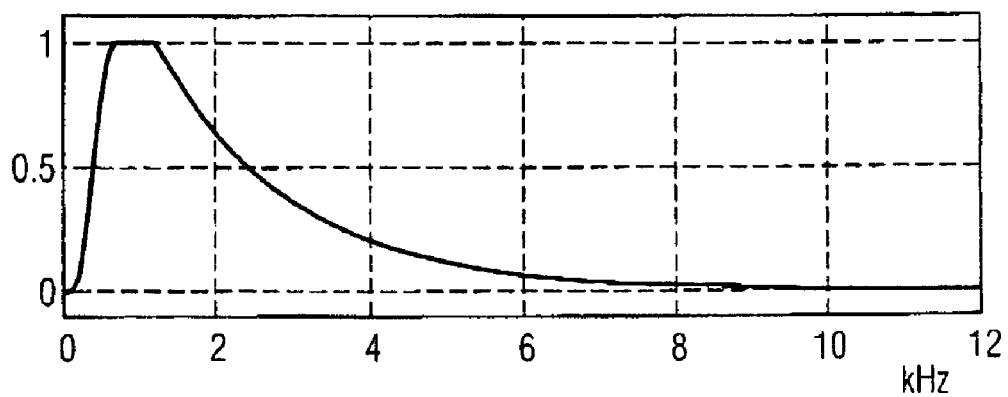
FIG. 8 shows a narrowband noise signal (simulation Example 3: single-sideband amplitude modulation without carrier adjunct, lower sideband)
Figure 8B:
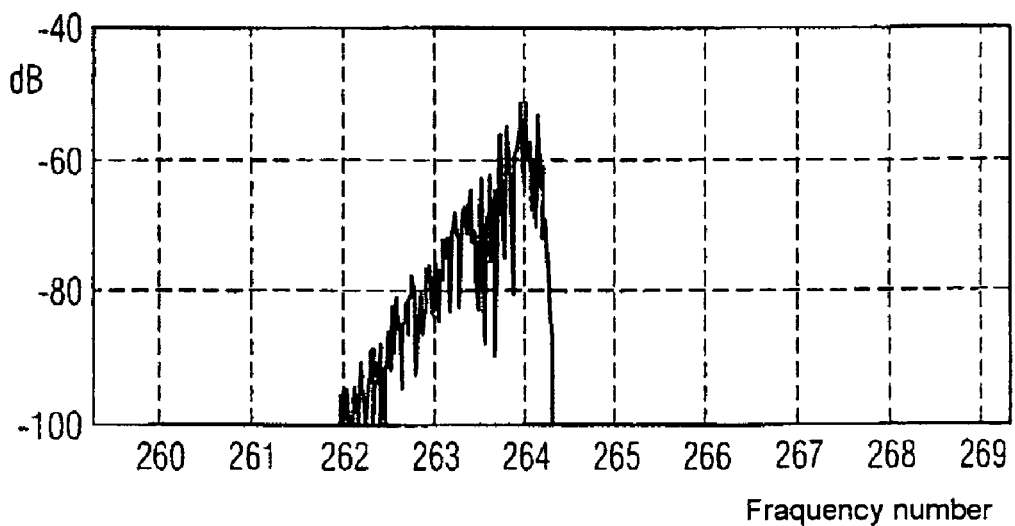
Figure 8C:
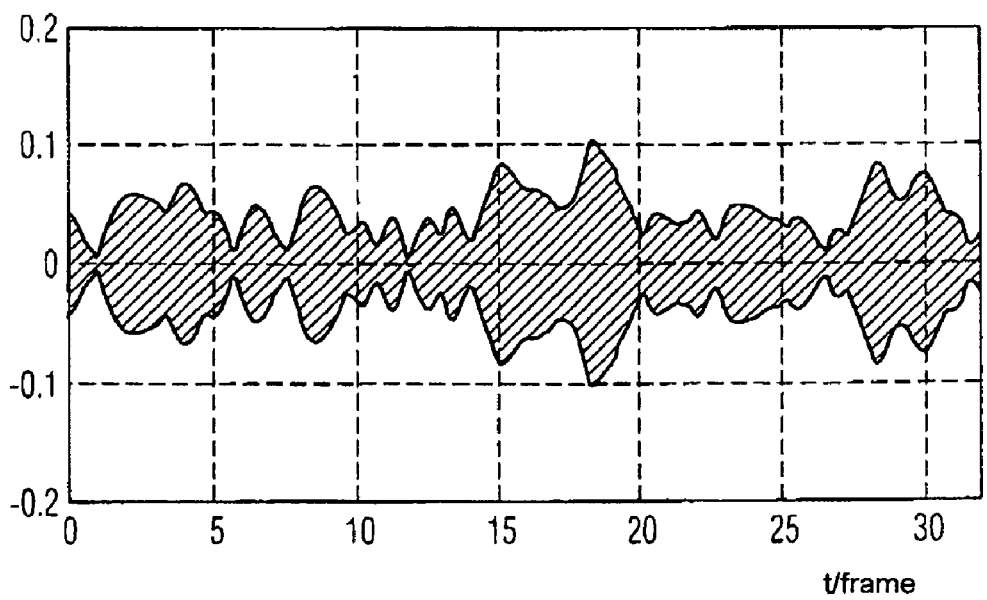
Figure 9A:
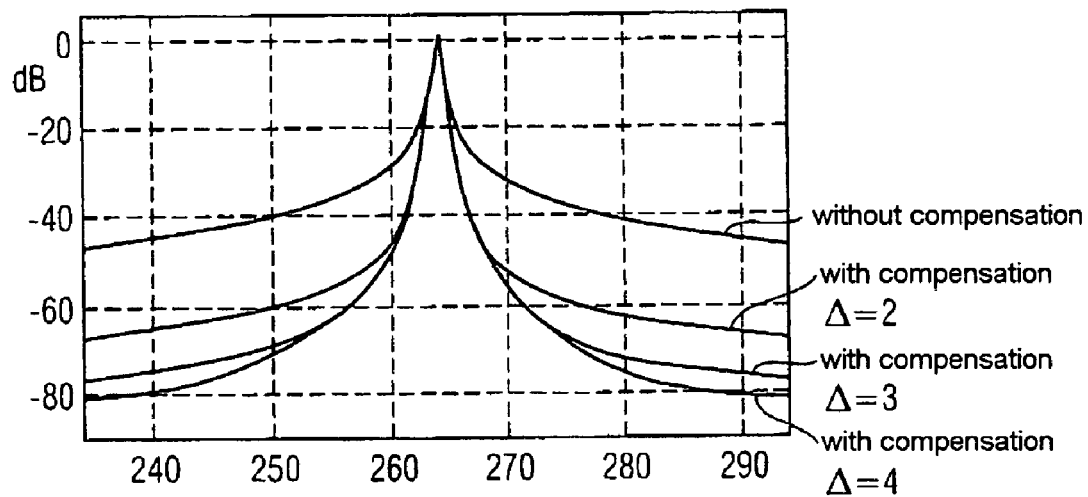
FIG. 9 shows the interference power density after the demodulation (FFT) with and without RFI compensation for simulation Example 3.
Figure 9B:
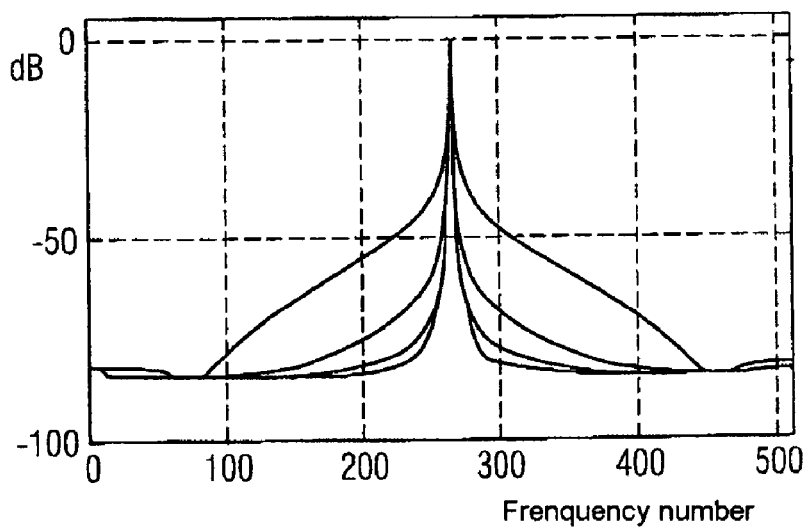
Figure 10A:
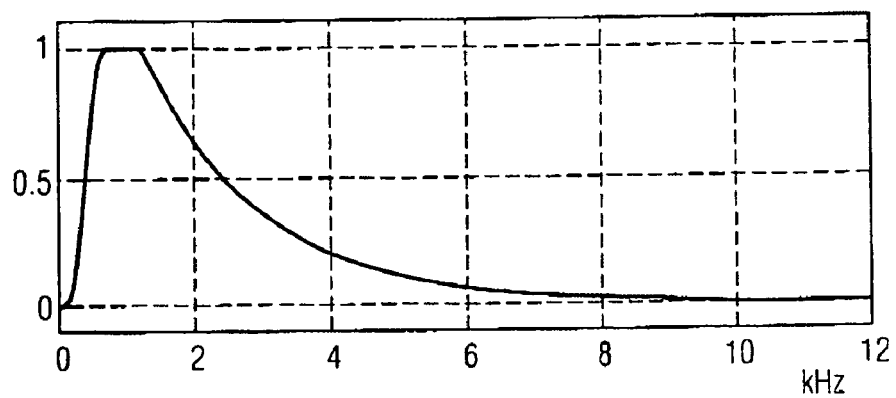
FIG. 10 shows a narrowband noise signal (simulation Example 2; single-sideband amplitude modulation without a carrier adjunct, upper sideband)
Figure 10B:
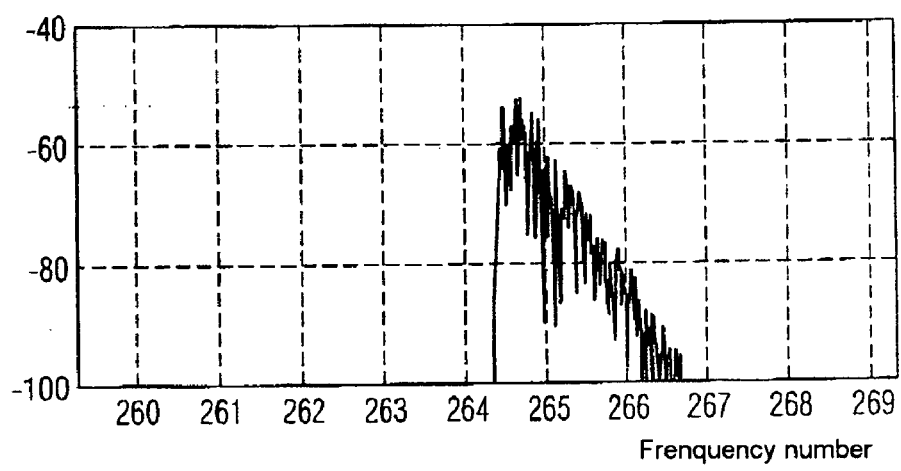
Figure 10C:
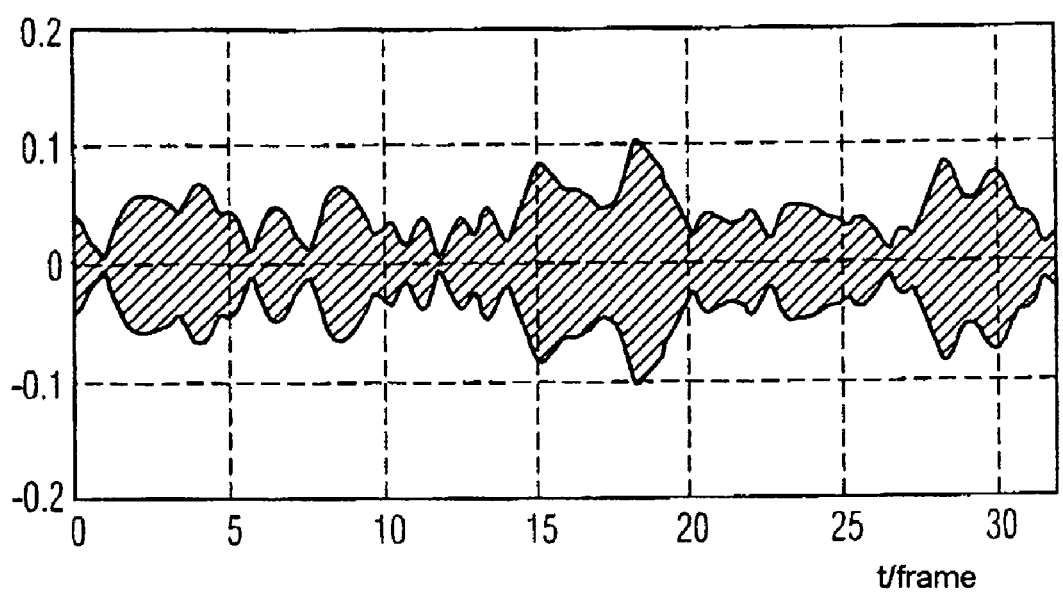
Figure 11A:
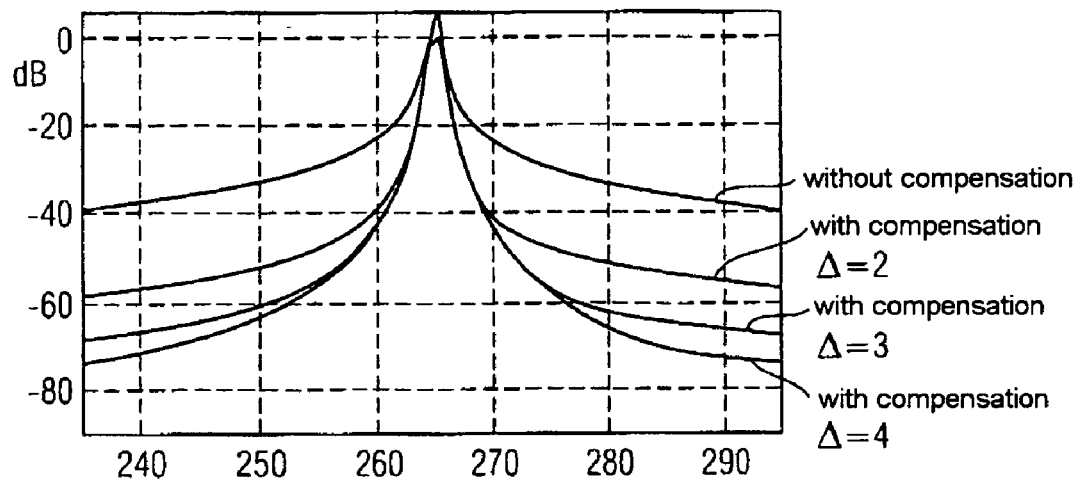
FIG. 11 shows the interference power density after the demodulation (FFT) with and without RFI compensation for simulation Example 2.
Figure 11B:
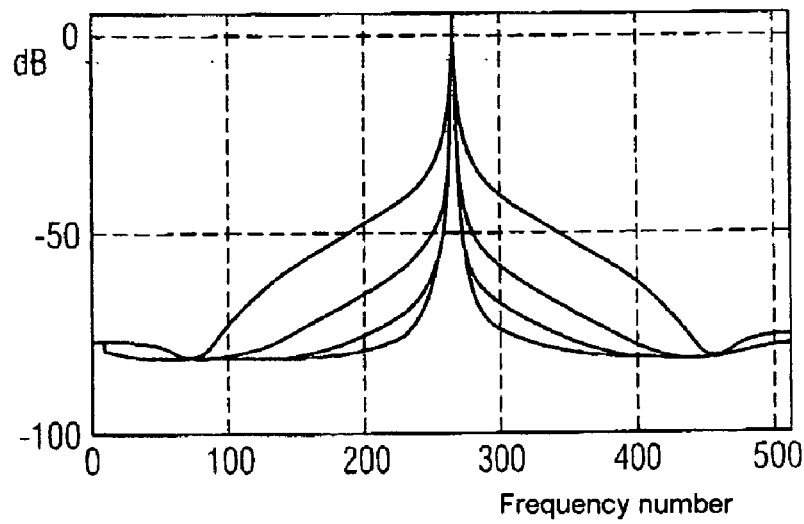

FIGS. 8 and 10 in each case illustrate the spectral masks of the interference signal in the low-pass filter range (a), the spectrum of the simulated interference signal (b) and an exert from the narrowband noise signal (c). FIGS. 9 and 11 in each case show the simulation results produced for Δ=2, 3 and 4. It is evident that as the observation region Δ increases, the residual error can be significantly reduced. Overall, it is thus evident that the method according to the invention is not related to a specific form or type of interference, but rather can be applied in a highly advantageous manner for interference formed in an arbitrary fashion (single-sideband or multi-sideband modulation with and without carrier).

Although the present invention has been described above on the basis of preferred exemplary embodiments, it is not restricted thereto, but rather can be modified in diverse ways.

In particular, the invention is not restricted to the above data transmission systems and methods, but rather can be extended for the purpose of RFI compensation to all systems and methods based on multicarrier data transmission. In particular, the invention shall not be restricted to VDSL data transmission, but rather can be extended to all xDSL data transmissions. Mobile applications such as DAB (=Digital Audio Broadcasting) or DBV-T (=Digital Video Broadcasting-Terrestrial) or OFDM-based WLAN applications (Wireless Local Area Network) are also conceivable.

It goes without saying that the elements of the compensation device according to the invention and also the specified FFT modules, IFFT modules and filters are conventional hardware components which, however, can also be realized in terms of software. Instead of an FFT or IFFT transformation, it is also possible to use any other transformations suitable for multicarrier transmission.

In particular, the invention shall not be restricted to the above numerical specifications, but rather can be modified in any desired manner within the scope of the invention and expert knowledge.

In the present patent application, the term "compensation of RFI interference" is always also to be understood as "reduction of RFI interference".

Although modifications and changes may be suggested by those skilled in the art, it is the intention of the inventor to embody within the patent warranted heron all changes and modificatioons as reasonably and properly come within the scope of his contribution to the art.

I claim as my invention:

1. A method for reducing Radio Frequency Interference (RFI) interference in a Discrete Multi-tone Transmission (DMT) data transmission comprising the steps of:

generating a compensation signal for the purpose of reducing an RFI interference signal superposed on a transmitted DMT reception signal using only carrier frequencies of said DMT reception signal in the vicinity of the interface frequency of said interference signal which are not utilized for the data transmission, said generating comprising providing at least one normalized complex spectral function for all carriers of said interference signal, carrying out an Fast Fourier Transform (FFT) for the purpose of obtaining spectral value of said DMT reception signal;

determining a frequency maximum of said interference signal situated within a current DMT data frame of said DMT reception signal;

assigning an observation window to said spectral values of said current DMT frame of said DMT reception signal, said observation window comprising at least one of said interference frequency;

calculating a complex evaluating coefficient for said current DMT frame, said complex evaluating coefficient resulting from said spectral values of said DMT reception signal within said observation window and said complex evaluating coefficient being identical for all frequencies with said current DMT frame; and calculating said compensation signal by multiplying said normalized complex spectral function with said complex evaluating coefficient, and shifting said compensation signal to the position of said frequency maximum of said respective interference signal and which provides, on the output side a further compensation signal adapted to the position of said interference signal removing said compensation signal from said DMT reception signal superposed with said interference signal.

2. The method of claim 1, comprising using a sinusoidal function used as a basis for said normalized complex spectral function.

3. The method of claim 1, comprising calculating said complex evaluating coefficient anew for each of said Discrete Multi-tone transmission (DMT) frames.

4. The method of claim 1, comprising shifting said compensation signal, prior to said subtraction, into the correct spectral position predefined by the spectral position of the frequency maximum of said interference signal.

5. The method of claim 1, comprising using the frequency maximum of said interference signal for determining said spectral position of an interference signal situated in said current DMT frame.

6. The method of claim 1, comprising monitoring at least one of the absolute values or the squares of said absolute values of said carrier frequencies of said DMT reception signal in order to determine whether an interference signal is present in said current DMT frame.

7. The method of claim 1, comprising storing said values of said complex spectral function in a memory.

8. The method of claim 1, comprising calculating said compensation signal only for carriers of said DMT reception signal which lie outside said observation window.

9. The method of claim 1, comprising using only the two values of said spectral DMT reception signal at the edge of said observation window for calculating said complex evaluating coefficient.

10. The method of claim 1, comprising calculating said compensation signal only for those of said carrier frequencies being outside said observation window, if an absolute value of the interference power density of at least one of said interference signal or of said compensation signal lies above a predefined threshold.

11. The method of claim 10, wherein said predefined threshold is in the range of between 60 dB and 45 dB.

12. The method of claim 10, wherein said predefined threshold is in the range of approximately 50 dB.

13. The method of claim 1, wherein said width of said observation window used is chosen in a manner dependent on at least of one of the type of said interference signal or the type of windowing used.

14. The method of claim 1, wherein said width of said observation window is adjustable.

15. A Discrete Multi-tone transmission (DMT) receiver circuit for a DMT data transmission system, comprising:

a Fast Fourier Transform (FFT) device, which subjects a received DMT data signal to an FFT for the purpose of obtaining spectral values of said DMT data signal; and an Radio Frequency Interference (RFI) compensator, which is connected downstream to said FFT device and carries out a compensation of an interference signal superposed on said received DMT data signal; the RFI compensator comprising a device for determining the frequency maximum of said interference signal situated within a current DMT data frame of said received DMT data signal and a shifting device, which performs an adaptation of a compensation signal to the position of said frequency maximum of said respective interference signal and which provides, on the output side, a further compensation signal adapted to the position of said interference signal, said RFI compensator being configured to:

generate said compensation signal for the purpose of reducing an RFI interference signal superposed on said received DMT data signal using only carrier frequencies of said received DMT data signal in the vicinity of the interference frequency of said interference signal which are not utilized for said data transmission;

provide at least one normalized complex spectral function for all the carriers of said interference signal;

carry out an FFT for the purpose of obtaining spectral values of said received DMT data signal;

assign an observation window to said spectral values of said current DMT frame of said received DMT data signal;

said observation window comprising at least one of said interference frequency;

calculate a complex evaluating coefficient for said current DMT frame;

said complex evaluating coefficient resulting from said spectral values of said received DMT data signal within said observation window and said complex evaluating coefficient being identical for all frequencies within said current DMT frame; and calculating said compensation signal by multiplying said normalized complex spectral function with said complex evaluating coefficient.

16. The receiver circuit of claim 15, wherein said RFI compensator comprises a first storage device, in which is stored at least one normalized complex spectral function for all the carriers of said interference signal.

17. The receiver circuit of claim 15, wherein said RFI compensator has a second storage device, in which at least the values of said observation window are stored.

18. The receiver circuit of claim 15, wherein said RFI compensator comprises a device for determining the frequency maximum of said interference signal situated within said current DMT data frame of said received DMT data signal.

19. The receiver circuit of claim 15, wherein said RFI compensator comprises a first calculation device, which determines a complex weighting coefficient that is identical for all frequencies within said current DMT frame and results from said spectral values of said received DMT data signal in said observation window.

20. The receiver circuit of claim 15, wherein said RFI compensator comprises a second calculation device, which calculates said compensation signal by multiplying said stored complex normalized spectral function with said complex evaluating coefficient.

21. The receiver circuit of claim 15, wherein said RFI compensator comprises a third calculation device, which subtracts said further compensation signal from said received DMT data signal and which provides an interference signal-reduced data signal on said output side.

* * * * *